United States Patent [19]

Nafziger et al.

[11] Patent Number: 5,290,818
[45] Date of Patent: Mar. 1, 1994

[54] FLEXIBLE POLYURETHANE REBOND FOAM HAVING IMPROVED TEAR RESISTANCE AND METHOD FOR THE PREPARATION THEREOF

[75] Inventors: John L. Nafziger, Lake Jackson; Steven B. Lowenkron, Houston; Charles E. Koehler, Baytown; Bruce N. Stevens, Longview, all of Tex.

[73] Assignee: The Dow Chemical Company, Midland, Mich.

[21] Appl. No.: 989,256

[22] Filed: Dec. 11, 1992

[51] Int. Cl.$^5$ .................... C08J 9/224; C08J 9/236
[52] U.S. Cl. .................... 521/54; 252/182.21; 264/45.4; 264/DIG. 7; 521/57; 521/137; 521/160
[58] Field of Search ............ 521/160, 54, 57, 137; 264/45.4, DIG. 7

[56] References Cited

U.S. PATENT DOCUMENTS

| | | | |
|---|---|---|---|
| 3,256,218 | 6/1966 | Knox | 521/54 |
| 3,894,973 | 7/1975 | Yunan | 521/137 |
| 4,014,826 | 3/1977 | Yunan | 521/54 |
| 4,385,131 | 5/1983 | Fracalossi | 521/55 |
| 4,683,246 | 7/1987 | Davis | 521/137 |

OTHER PUBLICATIONS

"Recyclin of Thermoset Polyurethane Elastomers" by Henri Ulrich, et al. in *Journal of Elastomers and Plastics*, vol. 11 pp. 208-212 (1979).
"Recycling of RIM Polyurea Elastomers by Thermal Processing" by Sachchida N. Singh, et al. Int'l Congress & Expo, Detroit, Mich., Feb. 25-Mar. 1, 1991 in SAE Technical Paper Series 910582.
"Recycling of RIM Scrap by Compression Molding" by Ronald P. Taylor, et al. Int'l Congress & Expo, Detroit, Mich., Feb.25-Mar. 1, 1991 in SAE Technical Paper Series 910581.
"Alcoholysis-a Process for Chemically Recycling PUR and Mixed Plastic Wastes" by Aalen Bauer in *Kunststoffe* 81 (1991) 4, pp. 30–305.
"Recycling Flexible Foam: A Novel Technology Produces a Quality product with Improved Economics" by B. D. Bauman, et al., Air Products & Chemicals, Inc. 1983 pp. 139-141.

*Primary Examiner*—Morton Foelak

[57] ABSTRACT

Rebond polyurethane foams can be prepared by coating shredded polyurethane foam with a prepolymer binder formulation which includes toluene diisocyanate distillation bottoms, compressing the binder coated foam, and the curing the binder with steam. The toluene diisocyanate distillation bottoms can be used in place of more expensive prepolymer formulation components such as toluene diisocyanate or methylene diphenyldiisocyanate. The toluene diisocyanate distillation bottoms can also improve elongation and tear resistance properties of the resultant rebond foams prepared therewith.

14 Claims, No Drawings

FLEXIBLE POLYURETHANE REBOND FOAM HAVING IMPROVED TEAR RESISTANCE AND METHOD FOR THE PREPARATION THEREOF

BACKGROUND OF THE INVENTION

The present invention relates to compositions of rebond foam. The present invention particularly relates to flexible polyurethane rebond foam compositions.

Polymer foams, particularly flexible polymer foams, can be fabricated into objects having useful shapes. For example, flexible foams can be molded or machined into shapes useful for preparing automobile seats, bedding, and the like. Flexible foams can be used in carpet and furniture production as well as in the manufacture of toys and the like.

However, in processes for preparing shaped polymer foams, waste foam can be produced. The waste foam can be from the fabricating process and represent the area/volume of the foam removed from the starting block stock to form the shaped foam object. Or, the waste foam can be just the off-specification products which are occasionally produced in some fabricating processes.

Whatever its source, waste foam production is usually undesirable. The waste foam can represent materials which must be discarded and not sold. In some areas, landfill space has become scarce and the cost of disposing of waste foam has become very high.

There have been efforts to re-use waste foam production, particularly waste and scrap from the production of flexible foams. Flexible polyurethane foam scrap can be chopped and then coated with a binder consisting of a polyisocyanate prepolymer having isocyanate functionality, and a catalyst. The coated, chopped foam is compressed and then treated with steam to cure the binder to form a rebond foam sheet or other shape.

In another process for using flexible polyurethane foam waste, the flexible foam waste is cryogenically ground and blended back into the formulation used to prepare it. The ground flexible foam can be used at a level of about 20 percent within the polyol component of the polyurethane foam formulation.

However, preparing materials including waste foam is not always trouble free. The resultant materials may have inferior physical properties. Or the materials so produced can have imperfect finishes which will not permit its use in external and visible applications.

SUMMARY OF THE INVENTION

In one aspect, the present invention is a method for preparing a flexible polyurethane rebond foam comprising a first step of applying a binder prepared from a formulation including (A) methylene diphenyldiisocyanate or polymethylene polyphenyl polyisocyanate; (B) toluene diisocyanate distillation bottoms; and (C) an active hydrogen containing material; to a shredded flexible polyurethane foam and a second step of compressing the coated foam in the presence of steam for a period of time sufficient to bind the shredded foam.

In another aspect, the present invention is a flexible polyurethane foam comprising a foam prepared by a two step method having a first step of admixing shredded flexible polyurethane foam and a binder prepared from a formulation including (A) methylene diphenyldiisocyanate or polymethylene polyphenyl polyisocyanate; (B) toluene diisocyanate distillation bottoms; and (C) an active hydrogen containing material; and a second step of compressing the coated foam in the presence of steam for a period of time sufficient to bind the shredded foam.

In yet another aspect, the present invention is an isocyanate prepolymer formulation useful as a binder comprising (A) methylene diphenyldiisocyanate or polymethylene polyphenyl polyisocyanate; (B) toluene diisocyanate distillation bottoms; and (C) an active hydrogen containing material Another aspect the present invention is, in a method of preparing a flexible rebond polyurethane foam by coating shredded flexible polyurethane foam with a polyisocyanate prepolymer binder and compressing the foam in the presence of steam to cure the binder, the improvement comprising preparing the binder from a formulation including toluene diisocyanate distillation bottoms.

The flexible polyurethane rebond foam of the present invention can have higher tear resistance and elongation than conventional rebond foam. Additionally, the rebond foams of the present invention are prepared with a binder formulation including toluene diisocyanate distillation bottoms, a material generally considered to be a waste material. Desirably, the TDI bottoms can be used to replace more costly materials such as MDI and TDI found in conventional binders thereby reducing binder cost.

DESCRIPTION OF THE PREFERRED EMBODIMENTS

In one embodiment, the present invention is a method for preparing flexible polyurethane rebond foam. In this method, shredded flexible polyurethane foam is coated with a binder. The shredded foam can be of any size which is compatible with equipment available to coat the foam. However, preferably, the foam is shredded into pieces having dimensions of from about 0.1 to about 5 cm, more preferably of from about 0.25 to about 7.5 cm, and even more preferably of from about 0.63 to about 1.27 cm.

The binder of the present invention can be applied in any way known to those skilled in the art of preparing rebond foam to be useful for applying a binder to shredded foam. For example, if the binder is merely sprayed upon bulk shredded foam, the shredded foam can be tumbled to insure a uniform coating of all surface areas of the foam. In the alternative, the foam can be suspended in a column of air and the binder applied either in a stream or as an aerosol. However the binder is applied, it is applied in an amount of at least 5 percent, preferably at least 7 percent, and even more preferably at least 8 percent of the total weight of the shredded foam and binder prepolymer.

The binder of the present invention is prepared from a formulation including (A) methylene diphenyldiisocyanate (MDI) or polymethylene polyphenyl polyisocyanate (PMDI); (B) toluene diisocyanate distillation bottoms (TDI bottoms); (C) an active hydrogen containing material; and, optionally, (D) toluene diisocyanate (TDI). The binder is, in fact, a prepolymer, with the admixture retaining isocyanate functionality. The exact ratio of materials to be used to prepare the binder of the present invention will vary depending upon the desired properties of the binder. For example, if a specific binder viscosity is desired, then the ratio of isocyanate and active hydrogen containing components will vary depending upon what materials are chosen for the binder formulation.

Generally, in the art of preparing prepolymers, the formulation for a prepolymer is determined based on the desired residual isocyanate group concentration. Care must be taken in preparing isocyanate prepolymers because if the ratio of equivalents of isocyanate groups to active hydrogen groups is too close to 1:1, a solid rather than a liquid can be formed. As a rule of thumb, prepolymers based on difunctional precursors should have a residual isocyanate group concentration of at least 2 percent. Prepolymers based on trifunctional precursors should have a residual isocyanate group concentration of at least 10 percent.

The amount active hydrogen group containing material and prepolymer required to prepare a prepolymer can be calculated using the formula:

Step I

A=NCO-eq.wt.+AH-eq.wt.

Step II

B=42.02/NCO-eq.wt.

Step III

X=(Z(A+X))/B wherein NCO-eq.wt. is the equivalent weight of the isocyanate component, AH-eq.wt. is the equivalent weight of the active hydrogen material, Z is the decimal percentage (i.e., 10 percent=0.1 decimal percent) of residual isocyanate groups desired in the prepolymer, and X is the amount of isocyanate component to be added in excess of 1:1 stoichiometry to prepare a prepolymer having Z residual isocyanate groups. For example, to prepare a prepolymer having 15 percent residual isocyanate groups from a 1,000 equivalent weight polyol and a 140 equivalent weight isocyanate:

A=140+1,000=1,140
B=42.02/140=0.3001
X=((0.15 (1,140+X))/0.3001=1,392

1,392 parts plus 140 parts isocyanate would be required for each 1,000 parts polyol.

The binder formulation of the present invention includes both TDI bottoms and either MDI or PMDI. TDI bottoms are a byproduct of commercial TDI production. It is known to prepare toluene diisocyanates by the phosgenation of toluene diamine. Typical processes for the phosgenation of amines can be found in U.S. Pat. Nos. 2,680,127; 2,822,373 and 3,781,320. In the phosgenation of toluene amines to form toluene diisocyanates, the product diisocyanate is generally distilled from the reaction mixture in which it is prepared. At the conclusion of the distillation, the reaction mixture normally contains a quantity of high boiling residue. Such residue generally comprises polymeric materials such as alpha, omega-isocyanato-biurets, polycarbodiimides, diisocyanato carbodiimides, polyuretidinediones, isocyanurates and various other isocyanate adducts. Since this residue is seldom commercially useful, it is usually disposed of.

The TDI bottoms also contain some residual TDI monomer. Generally, the range of TDI monomer in TDI bottoms will vary from about 5 to 40 percent. However, for the purposes of the present invention, the TDI bottoms will preferably contain from about 20 to about 30 percent TDI monomer. The TDI bottoms can be as produced from the TDI production unit if they are sufficiently reactive to form the prepolymer or they can be viscosity stabilized and/or higher reactivity TDI bottoms. For example, the TDI bottoms useful with the present invention can be those prepared by the method of co-pending U.S. patent application Ser. No. 07/647,328 or by the method of U.S Pat. No. 4,904,704.

The ratio of TDI bottoms to MDI or PMDI will vary with the desired viscosity of the prepolymer. However, for both economical and performance purposes, the prepolymer formulation will include as much of the TDI bottoms as can be easily handled during production of the prepolymer. The TDI bottoms, normally considered a waste or low value product, can be used with the present invention in place of some of the MDI or TDI found in conventional formulations. The TDI bottoms serve to both increase elongation and tear resistance and to replace an expensive prepolymer formulation component with a less expensive prepolymer formulation component. Therefore, the weight percent of TDI bottoms of the total weight of isocyanate group containing materials can be from about 1 to 99, but is preferably from about 10 to about 50, and even more preferably from about 15 to about 30.

MDI and PMDI are commercially prepared by the phosgenation of mixtures of the methylene dianiline and corresponding methylene-bridged polyphenyl polyamines. PMDI contains from about 20 to about 85, preferably from about 30 to about 75, percent by weight of MDI; about 3 percent to about 30 percent byproducts and impurities; and the remainder closely related polyisocyanates of higher molecular weight and functionality greater than about 2. TDI can be used in place of part of the MDI or PMDI, but use of TDI can decrease the improved physical properties of the present invention. Use of TDI also can cause a two phase system in preparing the prepolymer which could increase handling problems. Therefore, TDI, when it is used in the prepolymer binder formulation is preferably present at less than about 70 weight percent of the isocyanate group containing component.

The active hydrogen containing materials useful with the present invention are preferably any which can be used to prepare a flexible isocyanate based foam. Active hydrogen containing compounds most commonly used in polyurethane production are those compounds having at least two hydroxyl groups. Those compounds are referred to herein as polyols. Representatives of suitable polyols are generally known and are described in such publications as *High Polymers.* Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323-325 (1973); and *Developments in Polyurethanes.* Vol. I, J. M. Burst, ed., Applied Science Publishers, pp. 1–76 (1978).

Any active hydrogen containing compound can be used with the method of this invention. Examples of such materials include those selected from the following classes of compositions, alone or in admixture: (a) alkylene oxide adducts of polyhydroxy-alkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols".

Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also useful with the present invention are poly(oxypropylene) glycols, triols, tetrols and hexols and any of these that are capped with ethylene oxide. These polyols also include poly(oxypropyleneoxy-ethylene)-polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

Polyamines, amine-terminated polyols, polymercaptans and other isocyanate-reactive compounds are also suitable in the present invention. Polyisocyanate polyaddition active hydrogen containing compounds (PIPA) are use with the present invention. PIPA compounds are typically the reaction products of TDI and triethanolamine. A method for preparing PIPA compounds can be found in, for example, U.S. Pat. No. 4,374,209, issued to Rowlands.

Another class of polyols useful with the present invention are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

Yet another class of useful polyols are the polyester polyols. Particularly polyester polyols having difunctionality are useful with the present invention. Examples of useful polyester polyols include, for example, polybutanediol adipate and poly ε-caprolactone.

The polyols, polyamines and other active hydrogen containing materials of the present invention are preferably those which could be used to prepare a flexible isocyanate based foam. Such polymers generally have a molecular weight of from about 1,000 to about 10,000, preferably from about 2,500 to about 5,000 and most preferably from about 3,000 to about 4,000. If the active hydrogen containing material is a polyether, preferably it is a polyoxyalkylene polyether polyol wherein the oxides are propylene oxide and ethylene oxide and the ratio of propylene oxide to ethylene oxide is from about 20:1 to 2:1. Preferably, the nominal functionality of the active hydrogen containing materials of the present invention is from 2 to 4 and more preferably from 2 to 3.

The MDI or PMDI, TDI bottoms and active hydrogen containing material are admixed to prepare a prepolymer which can be used as a binder for shredded polyurethane foam. Any method known to those skilled in the art of preparing polyurethane prepolymers to be useful can be used to prepare the prepolymer of the present invention. Generally, the prepolymer can be prepared by admixing the formulation and stirring it at ambient temperature for a convenient period, for example, overnight. Alternatively, the admixture can be heated to about 55° C. and stirred for about 1 hour. Preferably, the admixture is stirred at ambient conditions overnight under an inert gas pad. Stirring should continue until most of the active hydrogens have reacted with the isocyanate groups. After the prepolymer is prepared, it can be applied to shredded polyurethane foam.

In addition to shredded polyurethane foam, the prepolymer of the present invention can be used to bind other materials or mixtures of polyurethane foam and other materials. The present invention is particularly useful for binding materials having isocyanate reactive moieties. For example, the present invention can be used to bind wood, paper, and inorganic materials such as sand, and the like. A matrix consisting of paper and shredded foam can be prepared by the method of the present invention. Flexible foam containing urea groups, thiourethane groups, and the like, in addition to or in place of polyurethane groups, can be used to prepare rebond foam pads by the method of the present invention. Unusual or specialty polyurethane foams can also be used with the present invention. For example, filled foams can be used with the present invention Rebond foam is known to be useful for several purposes. The rebond foam of the present invention can be used for such applications as packing foam, filler for structural voids, absorbent medium and the like. The rebond foams of the present invention, due to their superior properties and low cost, are particularly useful in carpet pad applications.

The following examples are provided to illustrate the present invention. The examples are not intended to limit the scope of the present invention and they should not be so interpreted. Amounts are in weight parts or weight percentages unless otherwise indicated.

Example 1

A high reactivity TDI bottoms is prepared by heating 27.9 lb (12.65kg) of TDI bottoms having about 25 percent free TDI to about 360° F. (183° C.) and admixing with a diglycidyl ether of bisphenol A having an epoxy equivalent weight of about 181 by slowly pumping the epoxy material into the TDI bottoms with constant stirring over a period of about 30 minutes. After the last of the epoxy material is added, the TDI bottoms and epoxy admixture is quickly cooled to about 122° F. (50° C.) and stored for three days. After the three day storage period, 18 parts of TDI bottoms epoxy admixture is further admixed with 82 parts PMDI having a viscosity of about of about 42 cps (0.042 Pa.s) to produce a TDI bottoms-PMDI solution having a viscosity of 200 cps (0.2 Pa s) and an isocyanate equivalent weight of 137, referred to hereinafter as "TBPP".

A prepolymer is prepared by admixing 253.8 parts TBPP and 200 parts of a mixed propylene oxide and ethylene oxide polyether polyol having a nominal functionality of 3 and a molecular weight of about 3,500. The polyol and TBPP are admixed and stirred overnight under a nitrogen pad. The resultant prepolymer has a residual isocyanate group concentration of 15.5 percent.

A rebond foam pad is prepared by placing 138.5 g scrap flexible polyurethane foam with dimensions of from about 1.0 to about 2.5 cm into a drum and then adding 12.85 grams prepolymer to the drum. The drum is rotated for 5 minutes at 60 to 100 rpm. The prepolymer coated foam is removed from the drum and placed between 12.25 in (31.2 cm) x 12.25 in (31.2 cm) perforated plates, compressed to thickness of 1 inch (2.54 cm) and exposed to steam for five minutes. The resulting rebond foam pad is removed from the plates, dried at ambient conditions for one week, and tested for physical properties. The physical properties are reported in the table below.

Example 2

A rebond foam pad is prepared and tested substantially identically to that of Example 1 except that the prepolymer is prepared from a formulation including 165.63 parts of TBPP, 41.41 parts of TDI, and 200 parts of a mixed propylene oxide and ethylene oxide polyether polyol having a nominal functionality of 3 and a molecular weight of about 3,500. The physical properties are reported in the table below.

Comparative Example 3

A rebond foam pad is prepared and tested substantially identically to that of Example 1 except that the prepolymer is prepared from a formulation including 56.0 parts PMDI having a nominal viscosity of 200 cps (0.200 Pa s) and 200 parts of a mixed propylene oxide and ethylene oxide polyether polyol having a nominal functionality of 3 and a molecular weight of about 3,500. The physical properties are reported in the table below.

Comparative Example 4

A rebond foam pad is prepared and tested substantially identically to that of Example 1 except that the prepolymer is prepared from a formulation including 56.0 parts PMDI having a nominal viscosity of 200 cps (0.200 Pa s), 10.2 parts TDI and 200 parts of a mixed propylene oxide and ethylene oxide polyether polyol having a nominal functionality of 3 and a molecular weight of about 3,500. The physical properties are reported in the table below.

Comparative Example 5

A rebond foam pad is prepared and tested substantially identically to that of Example 1 except that the prepolymer is prepared from a formulation including 38.0 parts TDI and 200 parts of a mixed propylene oxide and ethylene oxide polyether polyol having a nominal functionality of 3 and a molecular weight of about 3,500. The physical properties are reported in the table below.

TABLE

| | EXAMPLE 1 | EXAMPLE 2 | COMP. EXAMPLE 3* | COMP. EXAMPLE 4* | COMP. EXAMPLE 5* |
|---|---|---|---|---|---|
| DENSITY[1] lb/ft³ (kg/m³) | 3.87 (62.00) | 3.93 (62.90) | 3.88 (62.15) | 3.79 (60.71) | 3.79 (60.71) |
| ELONGATION[2] % | 47 | 52 | 19 | 25 | 41 |
| TEAR RESISTANCE[3] psi (kPa) | 0.63 (4.34) | 0.57 (3.93) | 0.50 (3.45) | 0.50 (3.45) | 0.60 (41.4) |

*Not an example of the present invention.
[1] ASTM D 3574-91 Standard Test for Flexible Cellular Materials - Slab, Bonded, and Molded Urethane Foams; Test A
[2] Id., Test E
[3] Id., Test F

What is claimed is:

1. A method for preparing a flexible polyurethane rebond foam comprising a first step of applying a binder prepared from a formulation including:
   (A) methylene diphenyldiisocyanate or polymethylene polyphenyl polyisocyanate;
   (B) toluene diisocyanate distillation bottoms; and
   (C) an active hydrogen containing material; to a shredded flexible polyurethane foam as a coating, and a second step of compressing the coated foam in the presence of steam for a period sufficient to bind the shredded foam.
2. The method of claim 1 wherein the binder is at least 5 weight percent of the total weight of the binder and foam.
3. The method of claim 2 wherein the binder is at least 8 weight percent of the total weight of the binder and foam.
4. The method of claim 1 wherein the binder formulation additionally includes toluene diisocyanate.
5. The method of claim 1 wherein the active hydrogen containing material is difunctional.
6. The method of claim 5 wherein the binder has a residual isocyanate group concentration of at least 2 percent.
7. The method of claim 1 wherein the active hydrogen containing material is trifunctional.
8. The method of claim 7 wherein the binder has a residual isocyanate group concentration of at least 10 percent.
9. The method of claim 1 wherein the toluene diisocyanate bottoms contain from about 5 to about 40 percent toluene diisocyanate monomer.
10. The method of claim 9 wherein the toluene diisocyanate bottoms contain from about 20 to about 30 percent toluene diisocyanate monomer.
11. The method of claim 1 wherein the weight percent of toluene diisocyanate bottoms is from about 10 to about 50 percent of the total weight of isocyanate group containing materials.
12. The method of claim 11 wherein the weight percent of toluene diisocyanate bottoms is from about 15 to about 30 percent of the total weight of isocyanate group containing materials.
13. The method of claim 1 wherein the active hydrogen containing material is a base polyol.
14. A flexible polyurethane foam prepared by the method of claim 1.

* * * * *